D. E. BOWE.
FISH DRESSING DEVICE.
APPLICATION FILED AUG. 7, 1922.
1,438,091.
Patented Dec. 5, 1922.
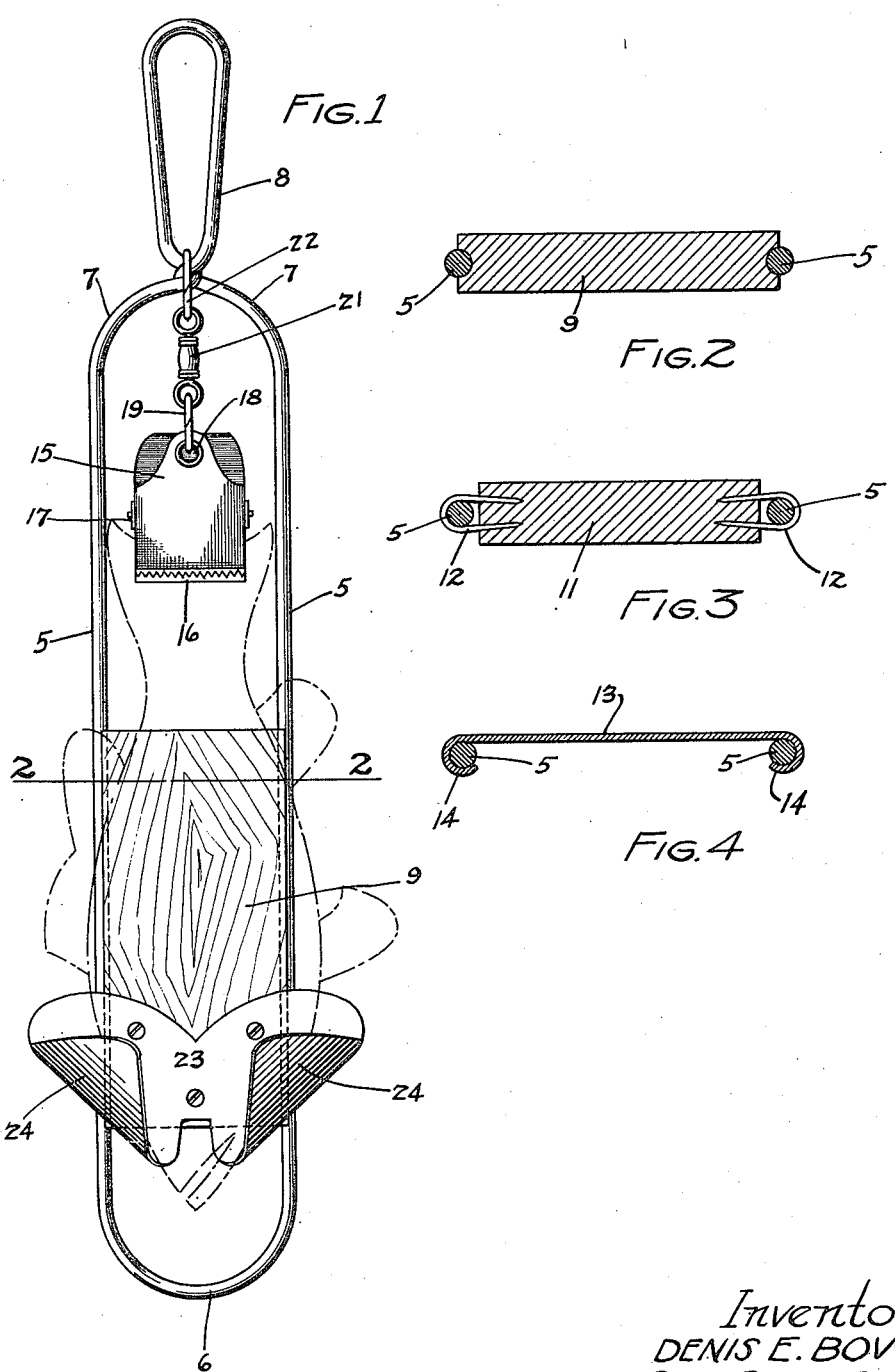
Inventor
DENIS E. BOWE
By Paul, Paul & Moore
ATTORNEYS Patented Dec. 5, 1922.

1,438,091

UNITED STATES PATENT OFFICE.

DENIS E. BOWE, OF WASECA, MINNESOTA.

FISH-DRESSING DEVICE.

Application filed August 7, 1922. Serial No. 580,157.

*To all whom it may concern:*

Be it known that I, DENIS E. BOWE, a citizen of the United States, resident of Waseca, county of Waseca, State of Minnesota, have invented certain new and useful Improvements in Fish-Dressing Devices, of which the following is a specification.

This invention relates to a device for dressing fish and is particularly directed to the production of such a device which is light and compact, adjustable to accommodate fish of different dimensions, and is inexpensive to manufacture. The device is further adapted to hold a fish so that the scales may be conveniently removed from one side and the fish thereafter turned over without release so that the scales may be removed from the other side.

The object therefore of this invention is to provide an improved fish-dressing device.

Other objects of the invention will more fully appear from the following description and the accompanying drawings and will be pointed out in the annexed claims.

In the drawings there has been disclosed a structure designed to carry out the objects of the invention, but it is to be understood that the invention is not confined to the exact features shown, as various changes may be made within the scope of the claims which follow.

In the drawings:

Figure 1 is a plan view of the device;

Figure 2 is a vertical sectional view on the line 2—2 of Figure 1;

Figure 3 is a view similar to that of Figure 2 but of a modified form of mounting the base; and Figure 4 is a similar view of a still further modification.

This device comprehends generally a support adapted to provide means to engage the opposite ends of a fish to be dressed, and, in order that a fish of various dimensions may be so engaged and held in operative dressing position there is provided means for adjusting one of these fish-engaging means. This is simply effected by providing a support with a base slidably carried thereon and by securing one of the fish-engaging means to the slidable base so that as the base is held in different adjusted positions the fish-engaging means are spaced the desired distance apart.

In the selected embodiment of the invention here shown, the support is formed of a wire-like member shaped to provide spaced parallel portions with closed ends. A metallic wire is employed for this purpose and is formed to provide the spaced portions 5 which extend in substantial parallelism with a closed end portion 6 at what may be termed the head end because the fish is preferably positioned upon the device with its head adjacent such end. The other end of the support is closed by the convergent portions 7 which are twisted about each other and thereafter extend to provide the handle 8. A base 9, preferably of wood, is slidably mounted upon the parallel portions 5 and extends thereacross and is adapted to be moved longitudinally of the support, being limited in its travel by the closed ends of the support the present preferred form of mounting the base upon its slideway being shown in Figures 1 and 2. For this purpose the longitudinal edges of the base 9 are grooved. Each groove is adapted to receive one of the wire portions 5. The base 9 may be inserted in position by pulling apart the wire portions 5. The preferred kind of wire employed for this support or frame is that having a quality of stiffness with some resiliency in order to provide a degree of frictional resistance to movement of the base upon the wires.

While describing the base and its mounting, reference may be had to several modifications which are shown in the drawings. In Figure 3, the base 11, preferably of wood, is of less width than the spaced wire portions 5. In this form a plurality of staples 12 are passed about the wire portions 5 and are embedded in the longitudinal edges of the base 11. In this type several such staples are provided on each longitudinal edge and the desired degree of frictional resistance for movement may be obtained by slightly bending the staple portions adjacent the wire portions 5.

In the form shown in Figure 4, the base 13, is shown formed of sheet metal which, on its longitudinal edges, is downwardly and inwardly curved upon itself to form integral curved guideways 14 adapted to embrace the wire portions 5 of the frame or support. While this metallic form provides a convenient and inexpensive form of base there is the disadvantage of a metallic surface presented to a knife used to sever the fish head.

The means for engaging the end of the fish adjacent the handle is here shown as a clamp. This clamp is of any usual form consisting of a relatively fixed portion 15 and the relatively movable part 16 which is pivotally secured to the former by means of the lug and pivot-pin mounting 17. The relatively fixed part of this clamp is provided with an eye 18 which is preferably in the longitudinal axis of the clamp. A link 19 connects the clamp and a common form of swiveled joint 21 in turn held by the link 22 passing through the loop forming the handle 8. The tail of the fish is preferably held by this clamping means while the means are provided adjacent the other end of the support to engage the fish head.

The means for engaging the head end of the fish is preferably mounted upon the base 9, so that provision is thus made for the different sizes of fish. Such head-engaging means is here shown as a piece of sheet metal shaped to provide a back 23 screwed to the base 9. The back 23 outwardly flares beyond the longitudinal edges of the base 9 and its opposed portions adjacent the closed end are curved backwardly in spaced relation from the back 23 to provide the guards 24. The folding lines of the guard are outwardly convergent, but do not meet, a space being preferably left for the introduction of the mouth end of the fish.

In operation of the device, the fish to be dressed is placed upon the frame support and its tail is inserted within the two jaws of the clamp. The base is then moved into position wherein the head end is engaged and held by the guards 24. Any convenient scraping tool may be used for removing the scales from a side of the fish whereupon the swiveled clamp permits the fish to be turned over and thereafter cleaned on the other side. When turning over the fish upon the support, it is preferable to lift the tail end of the fish which permits the head end of the fish to slip from the head-engaging means. This lifting may be easily accomplished because of the flexible connection between the clamp and frame. The fish may then be turned, its head re-inserted and the other side cleaned. After cleaning, the wooden base may be used as a chopping block to sever the head. Further, while the fish is still held upon the frame, a knife may be inserted in the vent and the fish slit open.

Having thus described my invention what I claim as new, and desire to secure by Letters-Patent is:

1. In a fish-dressing device, the combination of a support, a base slidably mounted upon the support, means oppositely carried on said support and adapted each to engage one end of a fish to be dressed, one of said fish-engaging means being mounted upon said slidable base whereby fish of different lengths may be held in operative dressing position.

2. In a fish-dressing device, the combination of a support, a base slidably mounted upon the support, clamping means on said support adapted to engage one end of a fish to be dressed, and means on said support to engage the other end of the fish, one of said fish-engaging means being mounted upon said slidable base whereby fish of different lengths may be held in operative dressing position.

3. In a fish-dressing device, the combination of a support, a base slidably mounted upon the support, clamping means secured to said support and adapted to retain one end of a fish to be dressed, and means to engage the other end of the fish, said engaging means being carried by said slidable base whereby fish of different lengths may be held in operative dressing position.

4. In a fish-dressing device, the combination of a support, a pair of spaced parallel elements forming a portion of said support, a base extending across and slidably mounted upon said elements, means oppositely carried on said support and adapted each to engage one end of a fish to be dressed, one of said fish-engaging means being mounted upon said slidable base whereby fish of different lengths may be held in operative dressing position.

5. In a fish-dressing device, the combination of a wire-like member shaped to provide a handle portion and a slideway, a base slidably mounted upon said slideway, means to engage one end of a fish secured to said member adjacent said handle portion, and means to engage the other end of the fish, said last-mentioned engaging means being carried by said slidable base whereby fish of different lengths may be held in operative dressing position.

6. In a fish-dressing device, the combination of a wire-like member shaped to provide spaced parallel portions closed at opposite ends, a base slidably mounted upon said spaced portions and extending thereacross, means to engage opposite ends of a fish to be dressed, one of said engaging means being secured to said member adjacent one closed end thereof and the other engaging means being mounted upon said slidable base whereby fish of different lengths may be held in operative dressing position.

7. In a fish-dressing device, the combination of a wire-like member shaped to provide spaced parallel portions closed at opposite ends, a handle provided at one of said closed ends, a base slidably mounted upon said spaced portions and extending thereacross, means to engage opposite ends of a fish to be dressed, one of said engaging means being secured to said member adjacent one closed end thereof and the other engaging means being mounted upon said slidable base whereby fish of different lengths may be held in operative dressing position.

8. In a fish-dressing device, the combination of a support, means oppositely carried by said support and adapted each to engage one end of a fish to be dressed, one of said fish-engaging means having a seat to receive one end of the fish and being slidably carried whereby fish of different lengths may be held in operative dressing position.

In witness whereof, I have hereunto set my hand this 27th day of July, 1922.

DENIS E. BOWE.